(12) United States Patent
Martens et al.

(10) Patent No.: US 10,106,018 B2
(45) Date of Patent: Oct. 23, 2018

(54) AUTOMATED WINDSHIELD GLARE ELIMINATION ASSISTANT

(71) Applicant: INTERNATIONAL BUSINESS MACHINES CORPORATION, Armonk, NY (US)

(72) Inventors: Holger Martens, Mainz (DE); Sharathchandra U. Pankanti, Yorktown Heights, NY (US); Erik Rueger, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/335,325

(22) Filed: Oct. 26, 2016

(65) Prior Publication Data

US 2018/0111451 A1  Apr. 26, 2018

(51) Int. Cl.
*G06F 7/00* (2006.01)
*B60J 3/04* (2006.01)
*B60J 3/06* (2006.01)
*B60J 1/02* (2006.01)

(52) U.S. Cl.
CPC . *B60J 3/04* (2013.01); *B60J 1/02* (2013.01); *B60J 3/06* (2013.01)

(58) Field of Classification Search
None
See application file for complete search history.

(56) References Cited

U.S. PATENT DOCUMENTS

| | | | |
|---|---|---|---|
| 2,607,906 A | 8/1952 | Sang | |
| 4,697,883 A | 10/1987 | Suzuki et al. | |
| 4,886,960 A | 12/1989 | Molyneux et al. | |
| 5,305,012 A | 4/1994 | Faris | |
| 5,768,020 A | 6/1998 | Nagao | |
| 5,877,897 A | 3/1999 | Schofield et al. | |
| 5,883,605 A | 3/1999 | Knapp | |
| 2003/0169213 A1 | 9/2003 | Spero | |

(Continued)

FOREIGN PATENT DOCUMENTS

| | | |
|---|---|---|
| DE | 10164063 B4 | 12/2007 |
| DE | 102012019755 A1 | 4/2014 |
| WO | 2009085404 A1 | 7/2009 |
| WO | 2013095359 A1 | 6/2013 |
| WO | 2015045691 A1 | 4/2015 |

OTHER PUBLICATIONS

P.F. Alcantarilla, L.M. Bergasa, P. Jimenes, M.A. Sotelo, I.Parra, D. Fernandez, "Night Time Vehicle Detection for Driving Assistance Light Beam Controller", 2008 IEEE Intelligent Vehicles, Jun. 4-6, 2008, 291-296, Department of Electronics. University of Alcala, Alcala de Henares (Madrid), Spain.

(Continued)

*Primary Examiner* — Adam M Alharbi
(74) *Attorney, Agent, or Firm* — Cahn & Samuels, LLP

(57) ABSTRACT

A method, system and computer program product for shielding an operator of a vehicle from light, including determining a position of a light source based on the location of the vehicle and the current date and time. A line of sight between the light source and the eyes of the operator is determined, where the line of sight goes through a windshield of the vehicle that includes a plurality of pixels. One or more pixels in the line of sight are identified; and, one or more physical properties of the pixel(s) in the line of sight are modified.

13 Claims, 6 Drawing Sheets

(56) References Cited

U.S. PATENT DOCUMENTS

| | | |
|---|---|---|
| 2008/0084499 A1 | 4/2008 | Kisacanin et al. |
| 2010/0065721 A1* | 3/2010 | Broude ..................... B60J 3/04 250/201.1 |
| 2014/0320946 A1 | 10/2014 | Tomkins et al. |
| 2015/0077826 A1 | 3/2015 | Beckman |
| 2015/0088334 A1* | 3/2015 | Bowers ................. G06Q 40/08 701/1 |

OTHER PUBLICATIONS

Xiaoquan Wu, Nong Xiao, Fang Liu, Zhiguang Chen, Yimo Du, Yuxuan Xing, "RAID-Aware SSD: Improving the Write Performance and Lifespan of SSD in SSD-based RAID-5 System", 2014 IEEE Fourth International Conference on Big Data and Cloud Computing, 99-103, State Key Laboratory of High Performance Computing College of Computer, National University of Defense Technology, Changsha, China.

Wikipedia; "Laminated Glass" [retrieved on Oct. 12, 2016]. Retrieved from the Internet: <URL: https://en.wikipedia.org/wiki/Laminated_glass>.

Hamid et al., "Vehicle as a Mobile Sensor", Queen's University, Technical Report 2014-618, Mar. 2014.

English Abstract of DE 10164063, Dec. 6, 2007.

English Abstract of DE 102012019755, Apr. 10, 2014.

\* cited by examiner

AUTOMATED WINDSHIELD GLARE ELIMINATION ASSISTANT

BACKGROUND

The present invention relates to systems, methods, and computer program products for an automated windshield glare elimination assistant. Mechanical visors are typically used to prevent glare by the sun or the headlights of oncoming vehicles such as cars, trucks, and motorbikes. Such mechanical visors are manually moved in the driver's visual field to protect against the glare. Virtually drawing a direct line from the driver's eyes to the light source, the mechanical visor is manually moved so that the visor is placed somewhere on the virtual line between the driver's eyes and the light source.

SUMMARY OF THE INVENTION

An embodiment of the invention provides a computer-implemented method of shielding an operator of a vehicle from light, including determining a position of a light source based on the location of the vehicle and the current date and time. A line of sight between the light source and the eyes of the operator is determined, where the line of sight goes through a windshield of the vehicle that includes a plurality of pixels. One or more pixels in the line of sight are identified; and, one or more physical properties of the pixel(s) in the line of sight are modified.

Another embodiment of the invention provides a system of shielding an operator of a vehicle from light, where the system includes a windshield having a plurality of pixels. A processor connected to the windshield determines the position of a light source based on a location of the vehicle and a current date and time. The processor determines a line of sight between the light source and eyes of the operator, where the line of sight goes through the windshield, and identifies one or more pixels in the line of sight. A controller operably connected to the processor modifies one or more physical properties of the pixel(s) in the line of sight based on the determination of the line of sight between the light source and the eyes of the operator.

BRIEF DESCRIPTION OF THE SEVERAL VIEWS OF THE DRAWINGS

Embodiments of the present invention are described with reference to the accompanying drawings. In the drawings, like reference numbers indicate identical or functionally similar elements.

DETAILED DESCRIPTION

Figure 1:
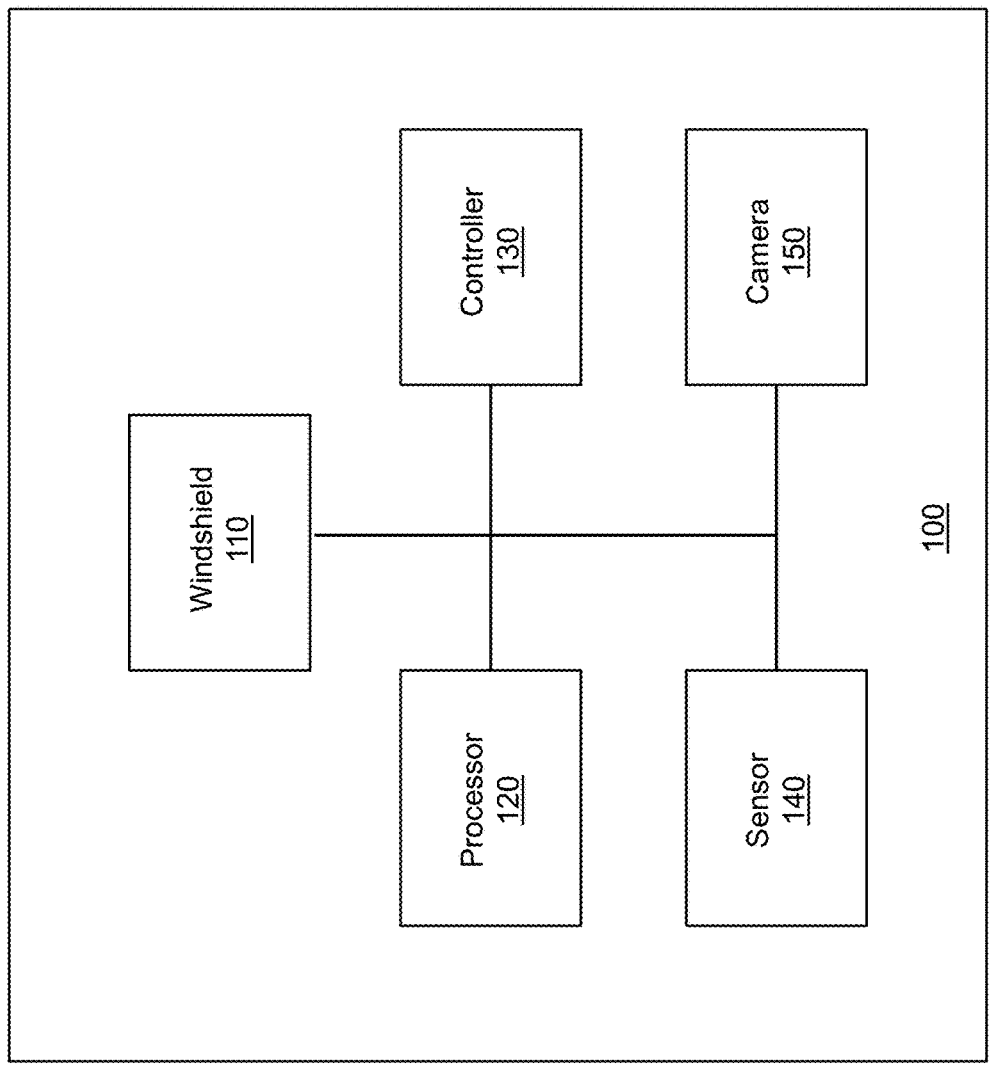
FIG. 1 illustrates a system for an automated windshield glare elimination assistant according to an embodiment of the invention.

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

At least one embodiment of the invention provides a method and system including an automatic glare shield for vehicle windshields that protects a vehicle driver from being blinded by natural light (e.g., sun) and/or artificial light (e.g., headlights). The automatic glare shield may not require any manual activity by the driver, which can provide increased comfort and/or less distraction for the driver. The automatic glare shield can provide faster protection against glare and can reduce the risk of accidents. This can provide increased safety for the driver as well as for other drivers and passengers.

A processor in an automatic glare shield controller can calculate a straight line between the driver's eyes and the outside light sources. Knowing the calculated straight line and the car's front screen position, the processor can calculate the area of the front screen to be darkened to prevent the driver from being blinded by the outside light sources. The automatic glare shield controller can use this information to electrically control the functional sub glare shield elements. All functional sub glare shield elements inside the calculated front screen area can be darkened.

In at least one embodiment of the invention, the system can leverage existing infrastructure to assess potential sun (and other known static structures, such as water bodies, mirrored buildings) location using sensors for geolocation (GPS), a sensor for time-of-day (and night) using connectivity, a sensor for vehicle heading (e.g., using temporal differencing), and/or use of inertial methods (e.g., low pass filter) to make these signals usable. The system can project the locations of static sources using windshield geometry on to the outward looking camera and validate the presence or absence of static sources in the camera image.

In addition, the system can exploit constraints of typical vehicle illumination sources, the range of breaking distances, interference distances, and/or the typical range of driver head geometry to generate candidate potential dynamic glare regions. The locations of moving sources can be projected using windshield geometry on to the outward looking camera. The presence or absence of the moving sources can be validated in the camera image.

The system can exploit the known 3D constraints on aerial, static, and moving glare sources, and/or driver head locations to narrow down the area of search for the sources within the camera image. The sources of the search can be validated based on image analytics; and, validated sources of glare can be projected to pixels on the windshield using imaging geometry. Gain control can be used to modulate the pixel transparency of projected pixels, where the driver can adjust the gain of transparency control.

Thus, the system provides increased visibility and improved comfort for the operator of a vehicle facing glare in the driving situations with sensors that detect the geo-location and heading of the vehicle, the date and time of day, the driver's view of the scene, the range of the driver's head position (i.e., the area in which the driver's head has been located or has commonly been located (e.g., x, y and z coordinates with respect to a fixed location)), and/or location information of sources of glare in the scene.

The system can enumerate ranges of 3D locations of glare due to known aerial, static, and/or moving structures and can projecting them on the camera image using scene and camera geometry. Validated regions can be projected on to windshield pixels based on the range of the driver's head position. The instrumentation at the locations in the windshield can be activated to adjust its transparency inversely proportional to the magnitude of glare.

FIG. 1 illustrates a system 100 for an automated windshield glare elimination assistant according to an embodiment of the invention. The system 100 includes a windshield 110 including a plurality of pixels and a processor 120 connected to the windshield 110. As used herein, the term "connected" includes operationally connected, logically connected, in communication with, physically or wirelessly connected, engaged, coupled, contacts, linked, affixed, and attached. As used herein, the term "processor" includes a computer hardware device, such as, for example, a central processing unit (CPU), an integrated circuit, or a microprocessor.

Figure 2:
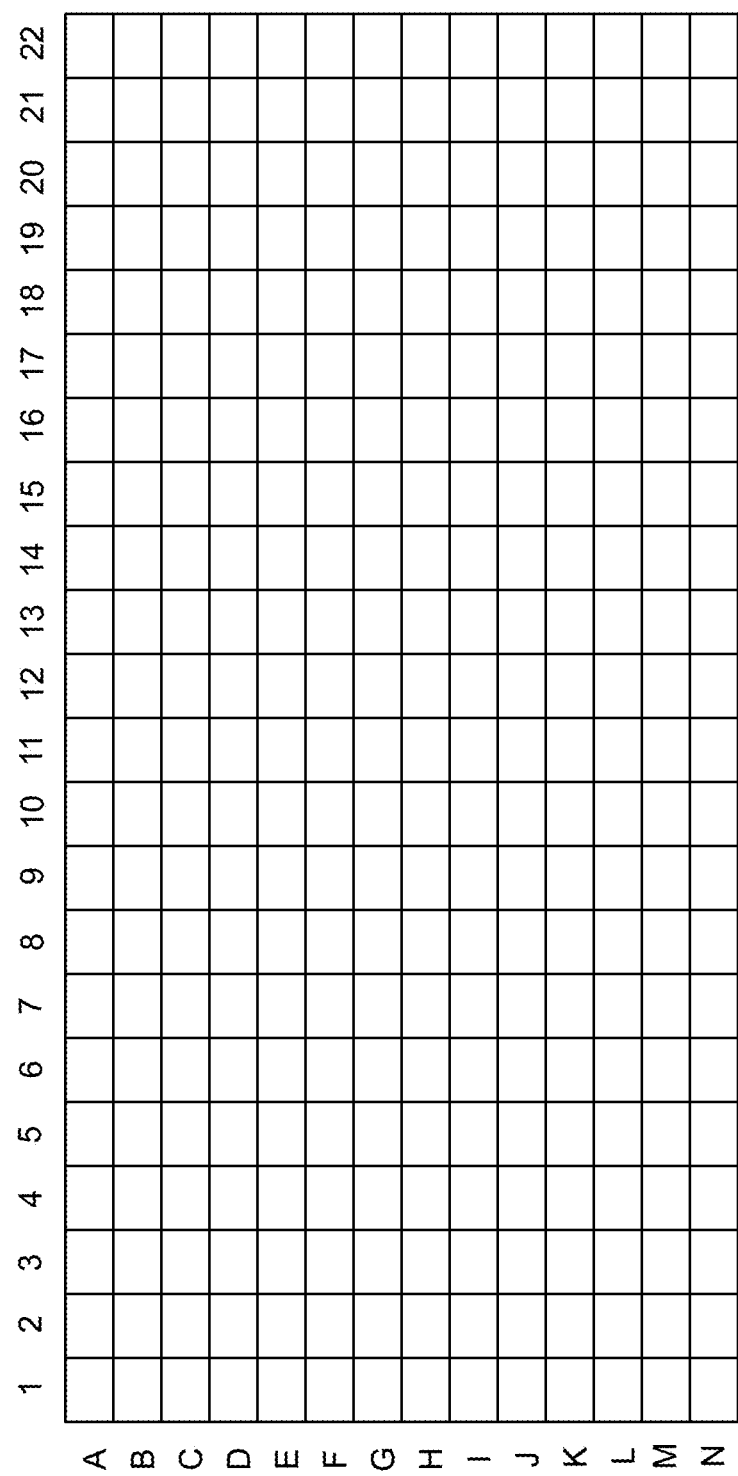
FIG. 2 illustrates the windshield including multiple pixels according to an embodiment of the invention.

FIG. 2 illustrates the windshield 110 including multiple pixels according to an embodiment of the invention. It is recognized that in other embodiments, the windshield 110 can have more pixels than illustrated in FIG. 2 or less pixels than illustrated in FIG. 2. In the embodiment illustrated in FIG. 2, the windshield 110 includes pixels A1-A22, B1-B22, C1-C22, D1-D22, E1-E22, F1-F22, G1-G22, H1-H22, I1-I22, J1-J22, K1-K22, L1-L22, M1-M22, and N1-N22.

The windshield 110 can have multiple layers, including inner and outer screen layers made of conventional tempered glass. One or more middle synthetic foil layers can be between the inner and outer glass layers to prevent the glass from slivering. In addition, a functional glare shield element layer can be between the inner and outer glass layers. The functional glare shield element layer can be a synthetic layer that is transparent and invisible by default (e.g., organic light-emitting diode (OLED) display).

Figure 3:
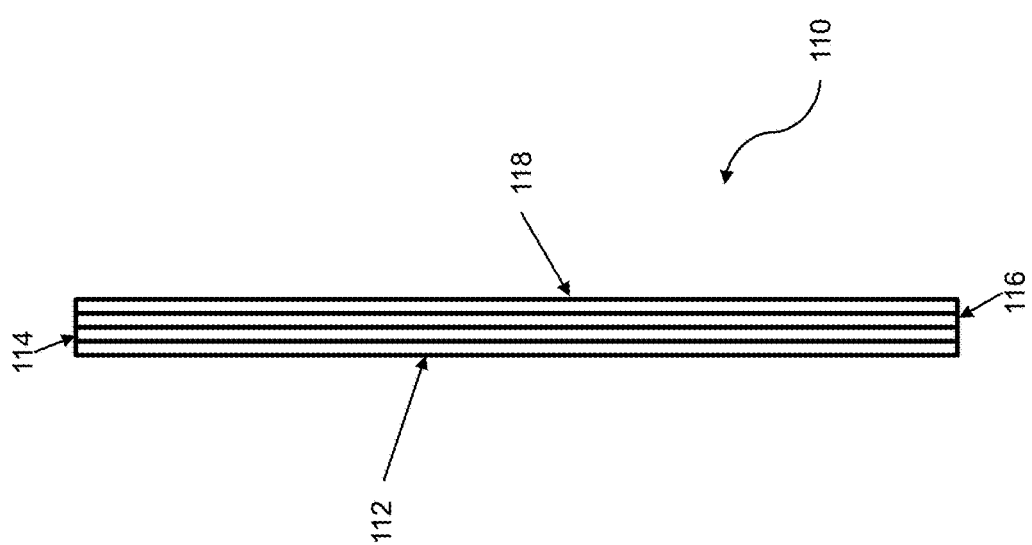
FIG. 3 is a side cross-sectional view of the windshield showing multiple layers according to an embodiment of the invention.

The functional glare shield element layer can be subdivided in multiple smaller elements (also referred to herein as "pixels"). For example, the functional glare shield element layer can be subdivided into 4096×1024 smaller elements. In this example, this construction will result in 4096 columns and 1024 rows or 4194304 smaller elements—similar to a LCD/LED computer display or television. Each of this multiple smaller elements is referred to herein as a "functional sub glare shield layer element". Each functional sub glare shield layer element can be controlled as a single entity. For instance, each functional sub glare shield layer element can change its color and its darkness (i.e., tint). Color and darkness can be changed by electrical control signals from the controller. FIG. 3 is a side cross-sectional view of the windshield 110 showing multiple layers according to an embodiment of the invention. The windshield 110 can include glass layers 112 and 118, a synthetic foil layer 114, and a functional glare shield element layer 116.

In the event of breaking, the windshield 110 can be held in place by the synthetic foil layer 114. The synthetic foil layer 114 can be formed from polyvinyl butyral (PVB) or ethylene-vinyl acetate (EVA) and can keep the glass layers 112 and 118 and the functional glare shield element layer 116 bonded even when broken. In at least one embodiment, the high strength of the high strength of the synthetic foil layer 114 prevents the windshield 110 from breaking up into large sharp pieces. This can produce a characteristic "spider web" cracking pattern when the impact is not enough to completely pierce the glass.

The processor 120 can determine the position of a light source (e.g., the sun) based on the location of the vehicle and the current date and time. In at least one embodiment, the light source is a reflection of the sun off of an object, such as a glass building or body of water. The processor 120 can determine the location of the object from a map and/or a database. The processor 120 can determine a line of sight (also referred to herein as a "straight line") between the light source and the eyes of the operator, where the line of sight goes through the windshield. The processor 120 can identify one or more pixels in the line of sight.

A controller 130 connected to the processor 120 can modify one or more physical properties of the pixel(s) in the line of sight (e.g., transparency, polarization, and/or color) to minimize the impact of the light source. For instance, modifying the physical properties of the pixel(s) can block, eliminate, or neutralize the light source. The controller 130 can darken the pixel(s) in the line of sight only when a first weather condition is identified. The first weather condition can include weather information that includes sunny or partly sunny, weather information that does not include cloudy or above a threshold chance of precipitation, and/or data from a sensor 140 on the vehicle that is above a threshold level of brightness.

In at least one embodiment, the controller 130 does not darken the pixel(s) in the line of sight when a second weather condition is identified. The second weather condition can include weather information including cloudy or partly cloudy, and/or data from the sensor 140 on the vehicle that is below a threshold level of brightness. Thus, the controller 130 can avoid darkening the pixel(s) when it is dark and/or raining.

In at least one embodiment, the system 100 includes at least one camera 150 (e.g., an inside stereoscopic camera and/or an outside stereoscopic camera). The inside stereoscopic camera 150 can continuously monitor the driver's eyes, head, and/or body position. The outside stereoscopic camera 150 can be directed in a forward driving direction and can continuously monitor all light sources outside of the car (i.e., light sources in the driver's view when the car is moving in forward direction). Video streams of the camera(s) 150 can be continuously analyzed by the processor 120. From the inside camera video stream, the processor 120 can identify the driver's eye position inside the car and the view direction. In parallel, the processor 120 can analyze the outside camera's video stream to identify all light sources outside the car in the forward driving direction.

In at least one embodiment, the processor 120 determines a route of the vehicle based on first data. The first data can include manual input from the operator (e.g., current location to 123 Main Street, Washington D.C.), the driving history of the vehicle (e.g., driver is going to XYZ address based on the time of day and driving history in past 10 days), and/or a navigation system in the vehicle (e.g., driver requested directions to Alexandria, Va.). The processor 120 can generate a predicted position of the light source based on the location of the vehicle, the route of the vehicle, and the current date and time. The processor 120 can generate a predicted position of the eyes of the operator based on the location of the vehicle, the route of the vehicle, the location of the driver's seat, and/or a profile of the user. The processor 120 can generate a predicted line of sight between the predicted position of the light source and the predicted position of the eyes of the operator, where the predicted line of sight goes through the windshield of the vehicle. The processor 120 can identify one or more pixels in the predicted line of sight; and, the controller 130 can adjusts the transparency of the pixel(s) in the predicted line of sight to darken the pixel(s) in the predicted line of sight.

In at least one embodiment, the processor 120 determines a three-dimensional position of the light source with respect to the camera 150 and identifies one or more pixels in the windshield where the light source is viewable based on the three-dimensional position of the light source with respect to the camera 150. The processor 120 can identify one or more headlight viewable through the windshield and determine the distance from the ground of the headlight(s). The processor 120 can determine the distance from the vehicle of the headlight(s) based on the distance from the ground of the headlight(s). The processor 120 can ignore the headlight(s) when the distance from the vehicle of the headlight(s) is above a threshold distance. In at least one embodiment, the system determines a line of sight between the headlight(s) and the eyes of the operator, identifies pixel(s) in the line of sight between the headlight(s) and the eyes of the operator, and prevents modification of the pixel(s) in the line of sight between the headlight(s) and the eyes of the operator when the distance from the vehicle of the headlight(s) is greater than a threshold distance.

In at least one embodiment, the processor 120 determines the distance from the vehicle of the light source, where the light source is one or more headlights. The controller 130 can modify the pixel(s) in the line of sight between the headlight(s) and the eyes of the operator when the distance from the vehicle of the headlight(s) is greater than a threshold distance.

In at least one embodiment, the processor 120 estimates the position of the sun based on the location of the vehicle and the current date and time. The processor 120 can determine the line of sight between the sun and the operator's eyes and identify one or more pixel in the line of sight between the sun and the operator's eyes. The controller 130 can adjust the transparency of the pixel(s) in the line of sight between the sun and the operator's eyes to darken the pixel(s) in the line of sight between the sun and the operator's eyes.

Figure 4:
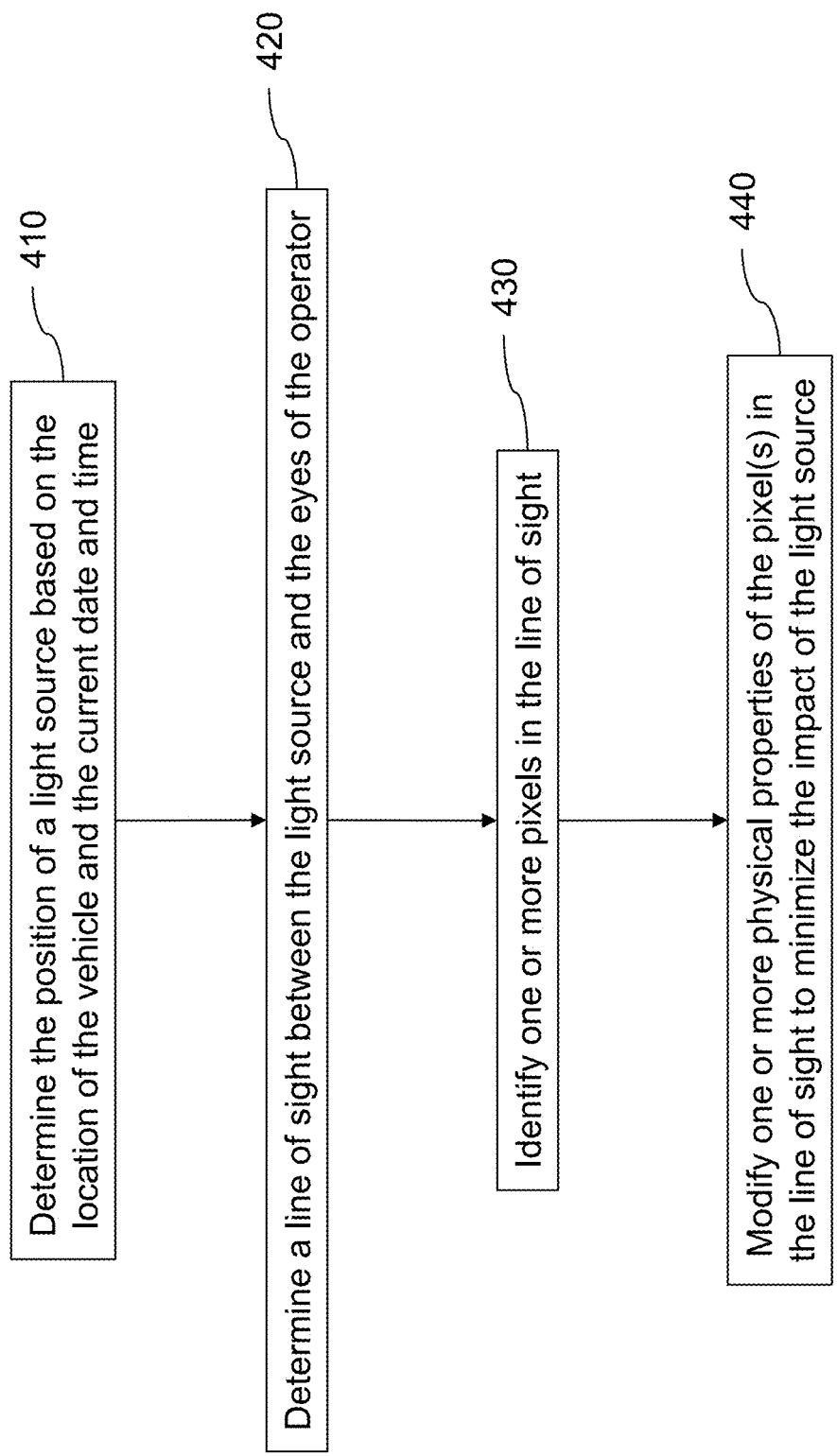
FIG. 4 is a flow diagram illustrating a method for an automated windshield glare elimination assistant according to an embodiment of the invention.

FIG. 4 is a flow diagram illustrating a computer implemented method of shielding an operator of a vehicle from light according to an embodiment of the invention (e.g., using the system 100). A processor can determine the position of a light source based on the location of the vehicle and the current date and time 410. The location of the vehicle can be determined from a mobile device in the vehicle having a GPS receiver, a wireless transceiver, and a display. The current date and time can be obtained from a clock in the system, a cell phone, and/or an online resource. The light source can be a reflection of the sun off of an object, and the position of the light source can be determined from a map and/or a database.

The processor can determine a line of sight between the light source and the eyes of the operator 420. The line of sight can go through the windshield of the vehicle, where the windshield includes a plurality of pixels. The processor can identify one or more pixels in the line of sight 430. A controller can modify one or more physical properties of the pixel(s) in the line of sight (e.g., transparency, polarization, and color) to minimize the impact of the light source 440.

In at least one embodiment, the modification of the physical property of the pixel(s) in the line of sight includes darkening the pixel(s) only when a first weather condition is identified. The first weather condition can include weather information including sunny or partly sunny, weather information that does not include cloudy or above a threshold chance of precipitation, and/or data from a sensor on the vehicle that is above a threshold level of brightness. In at least one embodiment, the pixel(s) in the line of sight are not darkened when a second weather condition is identified. The second weather condition can include weather information including cloudy or partly cloudy, and/or data from a sensor on the vehicle that is below a threshold level of brightness.

In at least one embodiment, a route of the vehicle is determined based on first data (e.g., manual input from the operator, driving history of the vehicle, and/or navigation system in the vehicle). A predicted position of the light source can be generated based on the location of the vehicle, the route of the vehicle, and the current date and time. A predicted position of the eyes of the operator can be generated based on the location of the vehicle and the route of the vehicle; and, a predicted line of sight between the predicted position of the light source and the predicted position of the eyes of the operator can be generated, where the predicted line of sight goes through the windshield of the vehicle. The processor can identify pixel(s) in the predicted line of sight; and, the transparency of the pixel(s) in the predicted line of sight can be modified with a controller to darken the pixel(s) in the predicted line of sight. Thus, a visual impairment (e.g., direct sunlight) can be predicted and blocked before the impairment is encountered and the block is needed.

In at least one embodiment, the processor determines a three-dimensional position of the light source with respect to a camera and identifies one or more pixels in the windshield where the light source is viewable based on the three-dimensional position of the light source with respect to the camera. The processor can identify one or more headlight viewable through the windshield and determine the distance from the ground of the headlight(s). The distance from the vehicle of the headlight(s) can be determined based on the distance from the ground of the headlight(s). The headlight(s) can be ignored by the processor (i.e., the physical properties of the pixels are not changed) when the distance from the vehicle of the headlight(s) is above a threshold distance. In another embodiment, the headlight(s) are ignored by the processor when the headlight(s) (or other light source) are below a threshold level of brightness (e.g., 75 lumens)).

In at least one embodiment, the processor estimates the position of the sun based on the location of the vehicle and the current date and time. A line of sight between the sun and the operator's eyes can be determined; and, one or more pixels in the line of sight between the sun and the operator's eyes can be identified. The controller can adjust the transparency of the pixel(s) in the line of sight between the sun and the operator's eyes to darken the pixel(s) in the line of sight between the sun and the operator's eyes.

Figure 5:
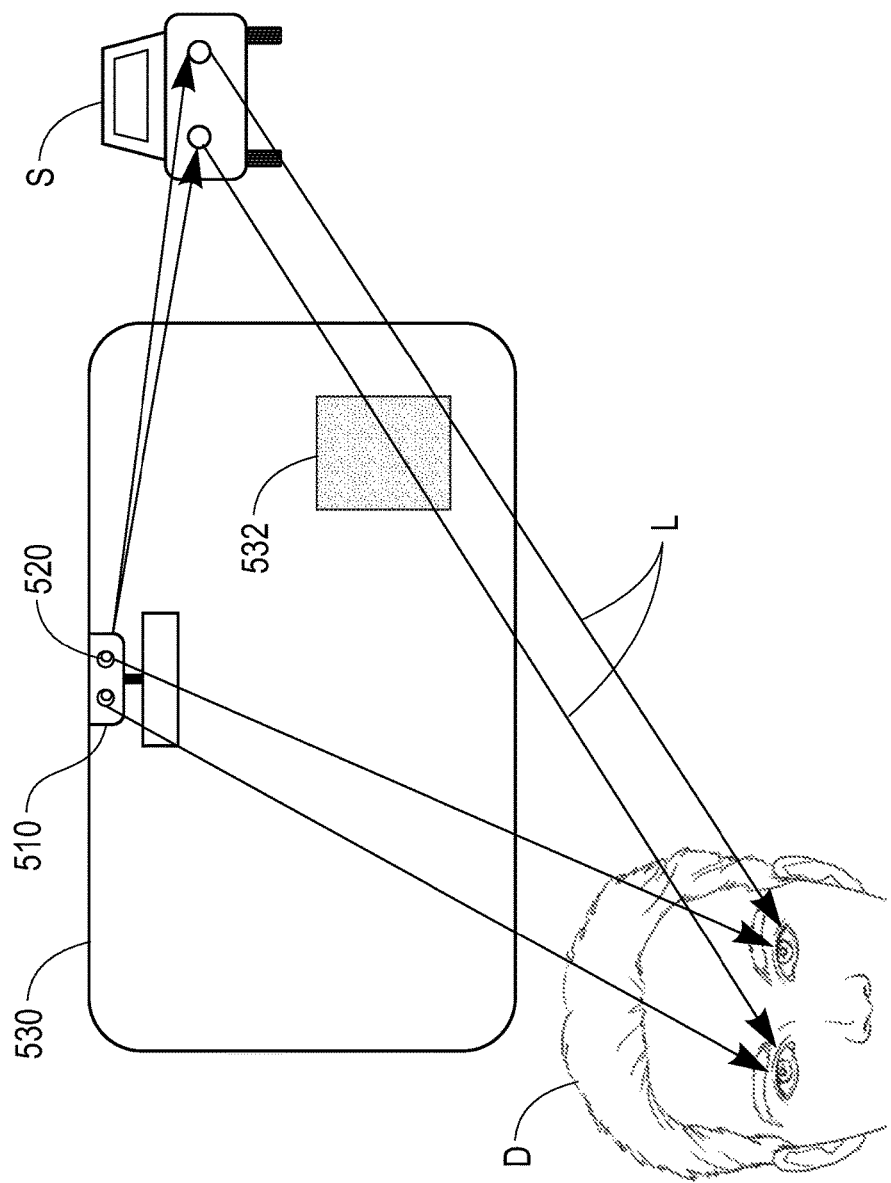
FIG. 5 illustrates a system for an automated windshield glare elimination assistant according to an embodiment of the invention.

FIG. 5 illustrates a system for an automated windshield glare elimination assistant according to an embodiment of the invention. The system includes a controller 510, an inside camera 520, an outside camera (not shown), and a windshield 530. As described above, the windshield 530 can include a plurality of pixels. The controller 510 can identify the position of the driver's eyes D from input from the inside camera 520 and outside light source S in front of the car from input from the outside camera. Thus, the controller 510 can calculate at least one line of sight L between the driver's eyes D and the outside light source S. Knowing the line of sight L and the position of the windshield 530, the controller 510 can calculate the pixels 532 of the windshield 530 to be darkened in order to prevent the driver from being blinded by the outside light source S.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
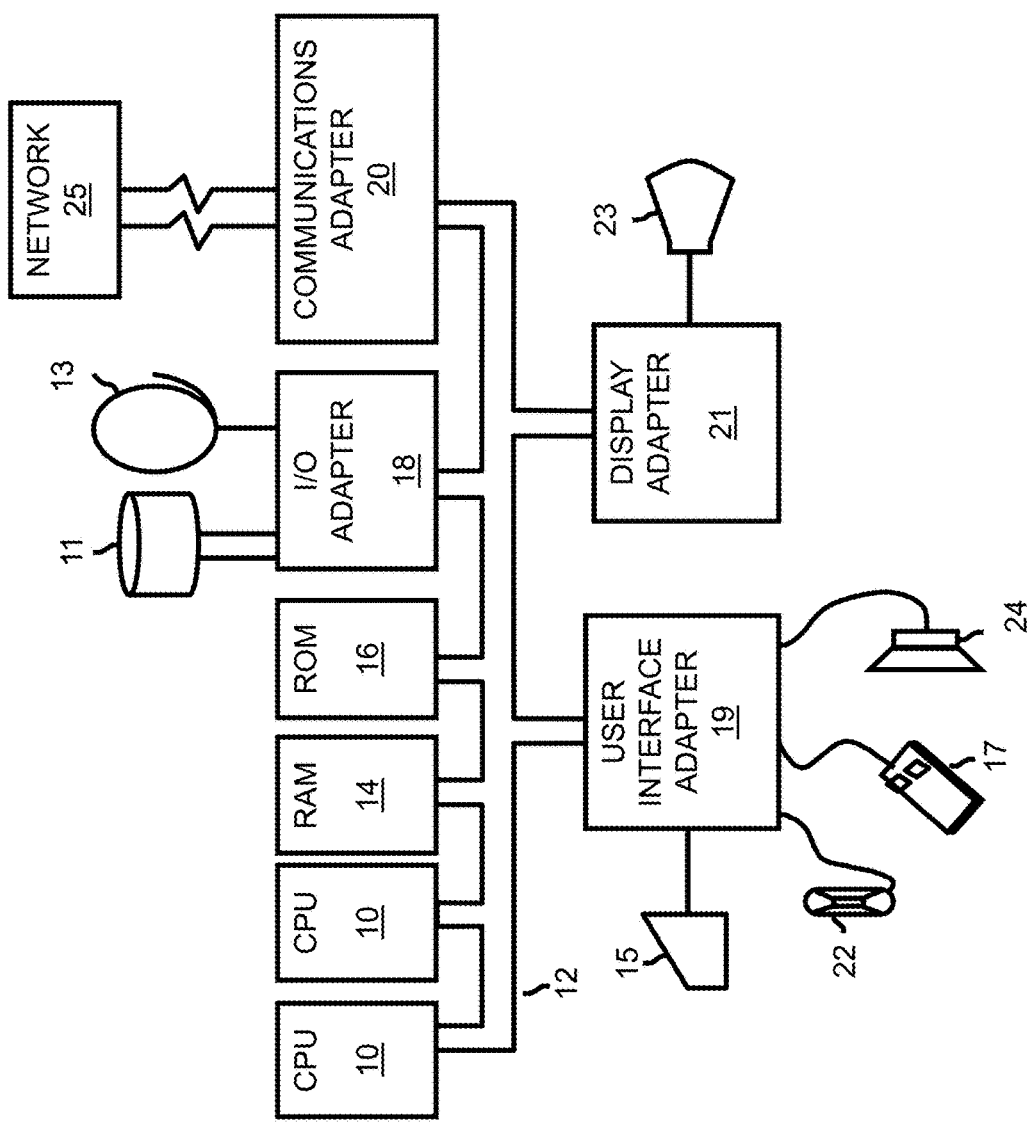
FIG. 6 is a diagram illustrating a system for an automated windshield glare elimination assistant according to an embodiment of the invention.

Referring now to FIG. 6, a system for practicing at least one embodiment of the invention is depicted. This schematic drawing illustrates system in accordance with at least one embodiment of the invention. The system comprises at least one processor or central processing unit (CPU) 510. The system components are interconnected via system bus 12. For example, CPUs 510 and various memory devices (such as a random access memory (RAM) 14, read-only memory (ROM) 16), and input/output (I/O) adapter 18 are interconnected via system bus 12. The I/O adapter 18 can connect to peripheral devices, such as disk units 11 and tape drives 13, or other program storage devices that are readable by the system. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to an output device, which may be embodied (by way of example only) as display device 23, monitor, printer, or transmitter.

In at least one embodiment of the invention, inventive program instructions (CPU readable/executable) are downloaded from a program storage device to RAM 14 and read/executed by the CPU(s) 510. The program instructions cause the system to execute at least one embodiment of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method of shielding an operator of a vehicle from light, said method comprising:
   determining a position of a light source based on a location of the vehicle and a current date and time;
   determining a three-dimensional position of the light source with respect to a camera;
   determining a line of sight between the light source and eyes of the operator, wherein the line of sight goes through a windshield of the vehicle, and wherein the windshield includes a plurality of pixels;
   identifying at least one pixel in the windshield and the line of sight where the light source is viewable based on the three-dimensional position of the light source with respect to the camera; and
   modifying at least one physical property of the at least one pixel in the line of sight.

2. The method of claim 1, wherein said physical property of the at least one pixel in the line of sight is selected from the group consisting of transparency, polarization, and color.

3. The method of claim 1, wherein said modifying of the at least one physical property of the at least one pixel includes darkening the at least one pixel when a first weather condition is identified, wherein the first weather condition is selected from the group consisting of:
   weather information includes sunny or partly sunny,
   the weather information does not include cloudy or above a threshold chance of precipitation, and
   data from a sensor on the vehicle is above a threshold level of brightness.

4. The method of claim 3, wherein the at least one pixel is not darkened when a second weather condition is identified, wherein the second weather condition is selected from the group consisting of:
   weather information includes cloudy or partly cloudy, and
   data from a sensor on the vehicle is below a threshold level of brightness.

5. A computer implemented method of shielding an operator of a vehicle from light, said method comprising:
   determining a position of a light source based on a location of the vehicle and a current date and time;
   determining a route of the vehicle;
   generating a predicted position of the light source based on the location of the vehicle, the route of the vehicle, and the current date and time;
   generating a predicted position of the eyes of the operator based on the location of the vehicle and the route of the vehicle;
   generating a predicted line of sight between the predicted position of the light source and the predicted position of the eyes of the operator, wherein the predicted line of sight goes through the windshield of the vehicle, and wherein the windshield includes a plurality of pixels;
   identifying at least one pixel in the predicted line of sight; and
   adjusting a transparency of the at least one pixel in the predicted line of sight with a controller to darken the at least one pixel in the predicted line of sight.

6. The method of claim 5, wherein said determining of the route of the vehicle is based on first data, wherein the first data is selected from the group consisting of manual input from the operator, a driving history of the vehicle, and a navigation system in the vehicle.

7. The method of claim 1, wherein the light source is a reflection of the sun off of an object, and
   wherein said determining of the position of a light source includes determining a location of the object from at least one of a map or a database.

8. The method of claim 1, further comprising:
   estimating a position of the sun based on a location of the vehicle and the current date and time;
   determining a line of sight between the sun and the eyes of the operator;
   identifying at least one pixel in the line of sight between the sun and the eyes of the operator; and
   adjusting a transparency of the at least one pixel in the line of sight between the sun and the eyes of the operator with a controller to darken the at least one pixel in the line of sight between the sun and the eyes of the operator.

9. A system of shielding an operator of a vehicle from light, said system comprising:

a windshield including a plurality of pixels;

a processor connected to said windshield, said processor determines a position of a light source based on a location of the vehicle and a current date and time, determines a line of sight between the light source and eyes of the operator, wherein the line of sight goes through the windshield, and identifies at least one pixel in the line of sight;

a camera connected to said processor, wherein said processor determines a three-dimensional position of the light source with respect to said camera, and identifies at least one pixel in the windshield where the light source is viewable based on the three-dimensional position of the light source with respect to said camera;

a memory operably connected to said processor; and a controller operably connected to said processor, said controller modifies at least one physical property of the at least one pixel in the line of sight based on the determination of the line of sight between the light source and the eyes of the operator.

10. The system of claim 9, wherein said controller modifies the at least one physical property by darkening the at least one pixel when a first weather condition is identified, wherein the first weather condition is identified based on data selected from the group consisting of:

data indicating sunny or partly sunny, and data from a sensor on the vehicle is above a threshold level of brightness.

11. The system of claim 10, wherein said controller does not darken the at least one pixel in the line of sight when a second weather condition is identified, wherein the second weather condition is selected from the group consisting of:

weather information includes cloudy or partly cloudy, and data from a sensor on the vehicle is below a threshold level of brightness.

12. The system of claim 9, wherein the light source is a reflection of the sun off of an object, and wherein said processor determines the location of the object from at least one of a map or a database.

13. The system of claim 9, wherein said processor:

estimates a position of the sun based on a location of the vehicle and the current date and time;

determines a line of sight between the sun and the eyes of the operator; and identifies at least one pixel in the line of sight between the sun and the eyes of the operator;

wherein said controller adjusts a transparency of the at least one pixel in the line of sight between the sun and the eyes of the operator to darken the at least one pixel in the line of sight between the sun and the eyes of the operator.

* * * * *